(12) United States Patent
Nadir

(10) Patent No.: US 8,191,831 B2
(45) Date of Patent: Jun. 5, 2012

(54) PARACHUTE RELEASE DEVICE FOR UNMANNED AERIAL VEHICLE (UAV)

(75) Inventor: Ronen Nadir, Tel-Mond (IL)

(73) Assignee: BlueBird Aero Systems Ltd., Kadima (IL)

( * ) Notice: Subject to any disclaimer, the term of this patent is extended or adjusted under 35 U.S.C. 154(b) by 979 days.

(21) Appl. No.: 11/992,188

(22) PCT Filed: Nov. 30, 2005

(86) PCT No.: PCT/IL2005/001281
§ 371 (c)(1),
(2), (4) Date: Mar. 18, 2008

(87) PCT Pub. No.: WO2007/034468
PCT Pub. Date: Mar. 29, 2007

(65) Prior Publication Data
US 2009/0308979 A1 Dec. 17, 2009

Related U.S. Application Data

(60) Provisional application No. 60/719,583, filed on Sep. 23, 2005.

(51) Int. Cl.
*B64D 17/00* (2006.01)
*B64D 17/54* (2006.01)
(52) U.S. Cl. ........................ 244/149; 244/139
(58) Field of Classification Search .............. 244/138 R, 244/139, 140, 141, 149, 152, 151 B, 137.3; 294/82.24, 82.25
See application file for complete search history.

(56) References Cited

U.S. PATENT DOCUMENTS

| | | | | |
|---|---|---|---|---|
| 2,458,212 A | * | 1/1949 | Smith | 244/139 |
| 3,154,271 A | * | 10/1964 | Pragnell | 244/149 |
| 3,602,142 A | * | 8/1971 | Bigeon et al. | 244/151 B |
| 4,033,528 A | | 7/1977 | Diggs | |
| 4,697,765 A | | 10/1987 | Wimmer | |
| 4,779,824 A | * | 10/1988 | Leger | 244/137.3 |
| 5,687,931 A | | 11/1997 | Hogan | |
| 5,697,581 A | * | 12/1997 | Conroy et al. | 244/137.3 |
| 5,810,293 A | * | 9/1998 | Leeki-Woo | 244/139 |
| 6,241,190 B1 | * | 6/2001 | Lunsford et al. | 244/137.3 |
| 6,578,885 B1 | | 6/2003 | Tillman | |
| 6,685,140 B2 | | 2/2004 | Carroll | |
| 7,306,188 B1 | * | 12/2007 | Heflin et al. | 244/149 |

OTHER PUBLICATIONS

International Search Report dated Nov. 30, 2006 for PCT/IL05/01281.

* cited by examiner

*Primary Examiner* — Joshua J Michener
(74) *Attorney, Agent, or Firm* — Eitan Mehulal Law Group

(57) ABSTRACT

The disclosure provides a parachute release device which may include a connecting element capable of connecting to an aircraft and to a parachute and a locking mechanism capable of releasing the connecting element from the aircraft upon being actuated by an actuator, wherein the parachute may be connected to the connecting element by a multiplicity of points, wherein the locking mechanism is adapted to inhibit a force from being applied to the actuator and wherein the device may be suitable for use in small weights aircrafts due to its small size and weight. The disclosure further provides a method for releasing a parachute from an aircraft, the method may include activating an actuator capable of releasing a locking mechanism, wherein the locking mechanism is adapted to release a connecting element from an aircraft upon being actuated, wherein the connecting element is adapted to connect a parachute and wherein the locking mechanism is adapted to inhibit a force from being applied to the actuator.

19 Claims, 9 Drawing Sheets

(a)

(b)

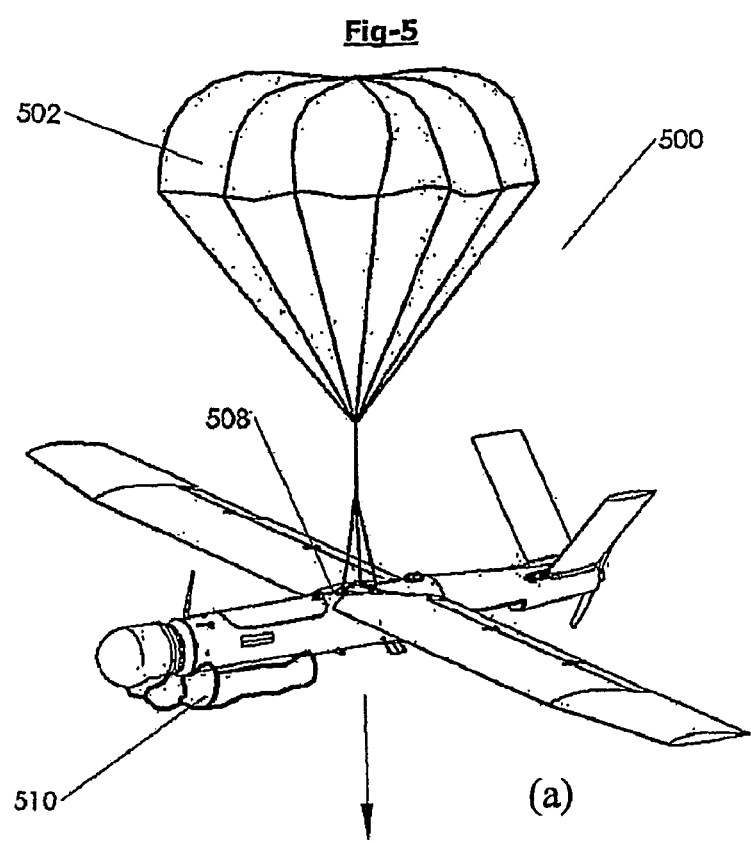

(a)

(b)

(c)

PARACHUTE RELEASE DEVICE FOR UNMANNED AERIAL VEHICLE (UAV)

CROSS-REFERENCE TO RELATED APPLICATIONS

The present application is a US National Phase of PCT Application No. PCT/IL2005/001281, filed on Nov. 30, 2005, which claims the benefit under 35 U.S.C. 119(e) of U.S. Provisional Application 60/719,583 filed Sep. 23, 2005, the entire disclosures of both of which are incorporated herein by reference.

BACKGROUND

One of the ways to recover a UAV (Unmanned Aerial Vehicle) in a certain area, often with unknown surface conditions, is using a recovery parachute. After being deployed, the parachute descends at a vertical speed, which is the result of the ratio between the parachute size and the total weight and aerodynamic shape of the UAV. During the descent, the parachute system also has a horizontal speed caused by the wind drift relative to the ground.

When the recovered UAV, suspended under the parachute reaches the ground surface, high winds may inflate the parachute and generate enough force to drag the UAV frame over the ground, causing damages to the UAV and to the payload carried on-board. Further damage to other frame components of the UAV may be caused if the fuselage and wings of the aircraft reach the ground surface at a non-horizontal position, which prevents the aircraft from landing on its energy absorption component. There is thus a need in the art to develop a mechanism that would allow horizontal landing of the UAV as well as efficient and reliable parachute release.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

In one embodiment, there is provided a parachute release device which may include a connecting element capable of connecting to an aircraft and to a parachute and a locking mechanism capable of releasing the connecting element from the aircraft upon being actuated by an actuator, wherein the locking mechanism is adapted to inhibit a force from being applied to the actuator. The inhibition of force from being applied to the actuator may, according to some embodiments, increase its reliability during the flight and parachute opening.

In another embodiment, there is provided a method for releasing a parachute from an aircraft, the method may include activating an actuator capable of releasing a locking mechanism, wherein the locking mechanism is adapted to release a connecting element from an aircraft upon being actuated, wherein the connecting element is adapted to connect a parachute and wherein the locking mechanism is adapted to inhibit a force from being applied to the actuator.

In another embodiment, there is provided an aircraft including a parachute release device, the devise comprises a connecting element capable of connecting to an aircraft and to a parachute via a multiple points connection, and a locking mechanism capable of releasing the connecting element from the aircraft upon being actuated by an actuator, wherein the locking mechanism is adapted to inhibit a force from being applied to the actuator. In another embodiment, the connecting element may be capable of connecting to a parachute via a multiplicity of connection points.

DETAILED DESCRIPTION

Figure 1:
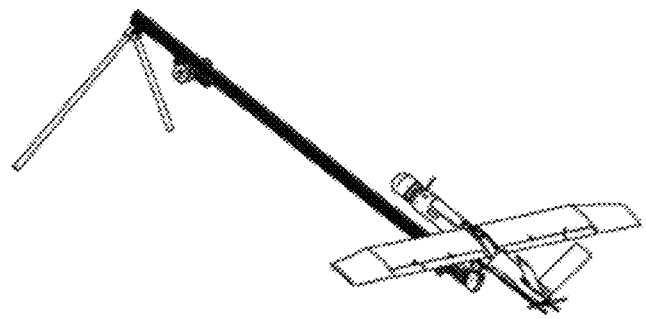
FIG. 1 schematically shows a UAV in position for launching from a catapult (a); and launching (b), according to some embodiments.
Figure 1:
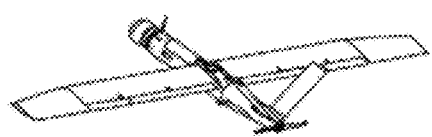
Figure 1:
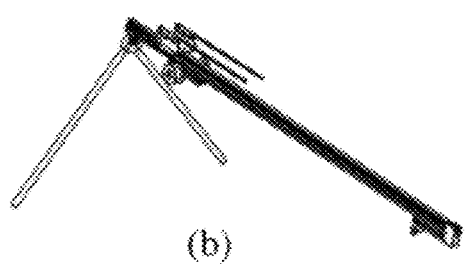

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the following description, various aspects of the invention will be described. For the purpose of explanation, specific configurations and details are set forth in order to provide a thorough understanding of the invention. However, it will also be apparent to one skilled in the art that the invention may be practiced without specific details being presented herein. Furthermore, well-known features may be omitted or simplified in order not to obscure the disclosure.

When the parachute is deploying, it applies a strong impact force on a UAV. The parachute release device may be designed, according to some embodiments, to withstand this high impact force without damaging the device and without being ripped off from the aircraft.

The parachute release device, according to additional embodiments, is designed to reduce the load on the operating actuator, which is used to release the parachute after landing.

The parachute release device, according to further embodiments, may be activated when the UAV touches the ground, in any wind condition and in any direction of the parachute relative to the aircraft frame, even if the UAV flips over and lands on its back and thus the drag of the UAV and further damage to its components are prevented.

Furthermore, in order to stabilize the UAV and keep it level during the time it is suspended under the parachute, the parachute, according to some embodiments, may be attached to the UAV frame at multiple points.

The parachute release device, according to some embodiments, may be submerged within the UAV frame and thus have low profile, which reduces the induced aerodynamic drag of the UAV.

In one embodiment, there is provided a parachute release device which may include a connecting element capable of connecting to an aircraft and to a parachute and a locking mechanism capable of releasing the connecting element from the aircraft upon being actuated by an actuator, wherein the locking mechanism is adapted to inhibit a force applied on the connecting element from being applied to the actuator. In another embodiment, the aircraft may be an unmanned aerial vehicle (UAV).

In another embodiment, there is provided a method for releasing a parachute from an aircraft, the method may include activating an actuator capable of releasing a locking mechanism, wherein the locking mechanism is adapted to release a connecting element from an aircraft upon being actuated, wherein the connecting element is adapted to connect a parachute in multiple points and wherein the locking mechanism is adapted to inhibit a force from being applied to the actuator. In another embodiment, the connecting element may be capable of connecting to a parachute via a multiplicity of connection points.

In another embodiment, the activating may be commanded by means of IR (infra red), RF (radio frequency), a servo commands generator, an on-board autopilot command, any combination thereof or any other appropriate way of activating an actuator.

In another embodiment, there is provided an aircraft including a parachute release device, the devise comprises a connecting element capable of connecting to an aircraft and to a parachute; and a locking mechanism capable of releasing the connecting element from the aircraft upon being actuated by an actuator, wherein the locking mechanism is adapted to inhibit a force from being applied to the actuator.

In another embodiment, the force may be torque. In another embodiment, a force applied on the connecting element may be a force resulting from the deployment of the parachute. In another embodiment, a force applied on the connecting element may be a high impact force, in the longitudinal direction, which results from the parachute deployment impact. In another embodiment, a force applied on the connecting element may be a force resulting from the suspension of the UAV under the parachute. In another embodiment, a force applied on the connecting element may be an acceleration force in the vertical direction, resulting from thermal conditions. In one embodiment the force applied on the actuator by the locking mechanism is essentially zero. In another embodiment the torque applied on the actuator by the locking mechanism is essentially zero. In another embodiment the torque applied on the actuator by the locking mechanism is below a predetermined value. In another embodiment, the predetermined value may be about 3 Nm. In another embodiment, the predetermined value may be between 1 and 100 Nm. In another embodiment, the predetermined value may be between 1 and 20 Nm. In another embodiment, the predetermined value may be between 0.1 and 10 Nm. In another embodiment, the predetermined value may be between 1 and 5 Nm.

In one embodiment, the term "inhibit" may be defined as prevent. In another embodiment, the term "inhibit" may be defined as reduce.

In one embodiment, the actuator may be a servo motor actuator, a solenoid actuator or a combination thereof.

In another embodiment, the servo motor actuator may be an electric (electromechanical) servo motor actuator, a hydraulic servo motor actuator or a combination thereof. In another embodiment, the term "servo" may refer to any device which may effect mechanical motion for a specific distance.

In another embodiment, the term "solenoid" may refer to any transducer devices that may convert energy into momentum. In another embodiment, a solenoid may be an electromechanical solenoid. In another embodiment, a solenoid may be a pneumatic solenoid. In another embodiment, a solenoid may be a hydraulic solenoid.

In one embodiment, the locking mechanism may be adapted to secure the connecting element to the aircraft when the locking mechanism is in a locked position and to release the connecting element from the aircraft when the locking mechanism is in an unlocked position. In one embodiment, the locking mechanism may be adapted to unlock upon being actuated by an actuator. In another embodiment, actuation may include a rotational movement of the locking mechanism.

In one embodiment, the connecting element is adapted to fit into a recessed contour cavity on the surface of the aircraft. In another embodiment, the connecting element is adapted to be in a secured position when the locking mechanism is in a locked position. In another embodiment, the connecting element is adapted to be in a secured position when the locking mechanism may be in a locked position. In another embodiment, the connecting element may be adapted to be in a non-secured position when the locking mechanism is in an opened position. The component on the top skin of the fuselage which is adapted to connect to the connecting element may be shaped to cage the connecting element in a negative groove for holding it in place even when forces are applied on the connecting elements, and may protects the mechanism from wear. Moreover, according to other embodiments, the connecting element may be submerged in the top part of the fuselage in order to decrease the aerodynamic resistance (drag).

In one embodiment, the connecting element may include a connecting arm adapted to be held by the locking mechanism when the locking mechanism is in a locked position and to be released from the locking mechanism when the locking mechanism is being actuated by the actuator.

In another embodiment, the connecting arm may reduce the force applying on the locking arm by diving the moment. In another embodiment, the connecting arm may include a hookup point adapted to connect to the parachute which hookup point may be higher than the pane defined by the connecting element In another embodiment, in cases where the force acting on the parachute pulls the parachute back relative to the UAV the higher hookup point is adapted to cause the generation of a moment that may lift the connecting element (for example but not limited to, the triangle shaped connecting element) from its groove and release it.

In another embodiment, the at lease one component of the locking mechanism may be positioned on top of at least one component of the connecting element (for example but not limited to, the connecting arm or the triangle shaped component) when the locking mechanism is in a closed position. In another embodiment, the locking mechanism may be positioned at certain distance in front of the front cable and the connecting element.

In another embodiment, the term "secure", "secured", "lock" or "locked" may refer to a geometrical lock. In another embodiment, the geometrical lock may refer to a structure wherein the connecting element cannot be released from its groove, move, or move in its groove when it is in locked position. In another embodiment, the term "secure", "secured", "lock" or "locked" may refer to any position wherein the connecting element cannot be released from the aircraft. In another embodiment, the term "non-secured", "opened" or "unlocked" may refer to any position wherein the connecting element can be released from the aircraft.

In one embodiment, during UAV parachute recovery, the parachute may be connected to the UAV at multiple points around the center of gravity in order to stabilize the UAV and keep it level. The stabilization of the frame in level position during the parachute descent is important in order to prevent the parachute lines from getting caught in one or more parts on the UAV, and to force the landing on the energy absorption component on the bottom of the UAV, that absorb the landing impact.

In another embodiment, the multiple connecting points may be mounted on the connecting element, which may be for example, but not limited to a detachable triangle shaped plate, assembled inside a special groove on the top of the fuselage in the designed position around the center of gravity.

In another embodiment, the term "multiple" or "multiplicity" may refer to any number higher than two.

During the parachute opening, the front cable may be pulled first, and since the hookup point is above the center of gravity point of the fuselage, the plane nose is pitching up to decrease the airspeed. This will decrease the forces acting on the frame during the shock of the parachute opening.

In one embodiment, the connecting element is adapted to connect to the parachute by at least three cables. In another embodiment, the three cables may be connected to one cable, wherein the one cable is connected to the parachute. In another embodiment, the point where all cables are connected to one cable may be referred to as the hookup point. In another embodiment, the connecting points between two or more cables and between a cable and any other component may be a hookup point. In another embodiment, a hookup point may be a flexible connection between to elements. In another embodiment, the hookup may include a ring, a loop, a shackle or any combination thereof. In another embodiment, the hookup point may be above the center of gravity point of the fuselage. Since the hookup point is above the center of gravity point of the fuselage the aircraft may remain level during the parachute descent. In another embodiment, the length of the front cable (the cable closest to the locking mechanism) may be shortened or lengthened in order to control the angle of the plane during the descent, for example but not limited to, level but with nose-down or level but with nose-up.

The UAV may be hooked to the parachute in more then one point which may allow stabilization of the UAV during the parachute descent stage, in order to keep it in horizontal position and to reduce impact damages to the frame.

The connecting element, according to some embodiments, may be a triangle shaped component, a triangle detachable part structure or may include a triangle shaped component In another embodiment, the angle between the lower surface of the component and one side of the component is a locking angle. In another embodiment, the angle between the lower surface of the component and one side of the component is an acute angle. In another embodiment, the angle between the lower surface of the component and the rear side of the component is an acute angle. In another embodiment, the acute angle may be between 30 and 60 degrees. In another embodiment, the acute angle may be between 40 and 50 degrees. In another embodiment, the acute angle may be about 45 degrees. In another embodiment, the rear side of the triangle is the triangle side which is farther from the connecting arm. During the deployment impact, when a longitudinal force is acting to pull the connecting element out from its groove, the acute angle may, according to some embodiments, be a locking angle which may lock the connecting element against the acute angle of the groove, in a geometrical lock (acute angle against an acute angle).

In another embodiment, the angles between the lower surface of the component and each of the other two sides of the component are draft angles. In another embodiment, the draft angles allow the release of the connecting element.

The connecting element, or the triangle shaped component, according to some exemplary embodiments, may have a locking angle edge (undercut) at the rear side beneath the rear connecting points. All other edges may have a draft angle that may allow the part to be easily removed by pulling each of the lines that connect the parachute to the triangle, once unlocked. After the aircraft reaches the ground, the forces acting on the inflated parachute may pull the lines in any direction and the triangle may be released, leaving the aircraft safely on the ground.

The structure geometry of any parachute release device disclosed herein, may allow the parachute to be release in any angle of the parachute relative to the aircraft.

In another embodiment, the parachute release device may be suitable for light weight UAV systems. In another embodiment, the parachute release device may weigh between 5-500 g. In another embodiment, the parachute release device may weigh between 10-200 g. In another embodiment, the parachute release device may weigh between 50-180 g. In another embodiment, the parachute release device may weigh between 50-100 g.

In one embodiment, the UAV may be launched form a catapult as described in FIGS. 1a and b. In another embodiment, the UAV may be launched from any appropriate apparatus or device or by any other suitable method. In another embodiment, the tern "launch" or "launched" may refer to any process that may enable take-off of a UAV.

Figure 2:
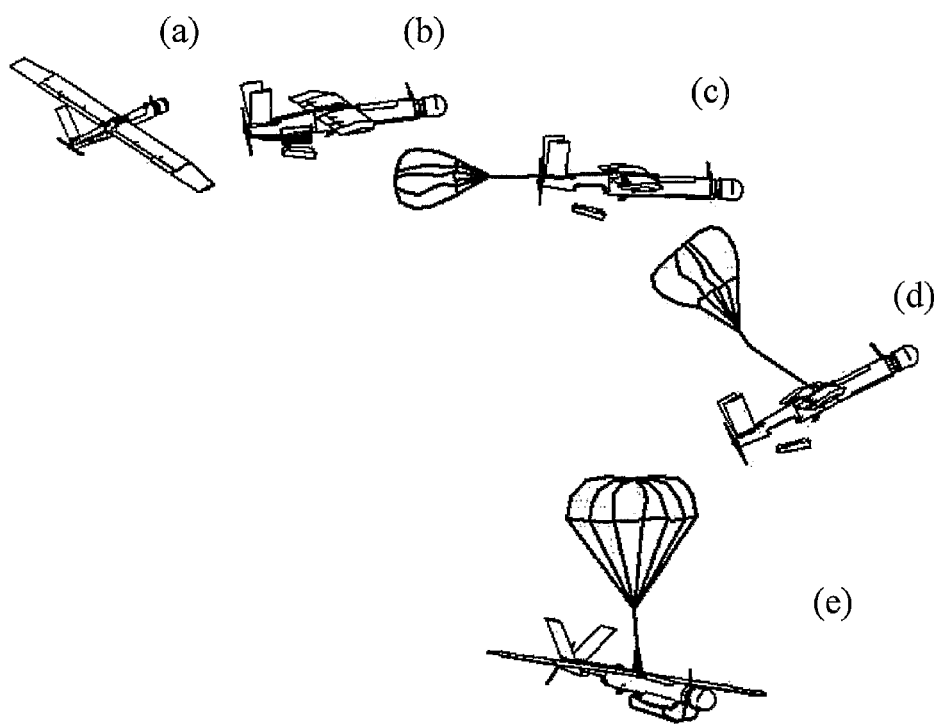
FIG. 2 schematically shows the stages (a-e) of a UAV recovery process, according to some embodiments.

In one embodiment, the recovery process of a UAV may be described for example in FIG. 2(a-e). In another embodiment, the recovery process may include a series of actions that may take place when a landing procedure is activated, automatically, manually or by any means capable of activating a landing procedure. In another embodiment, a parachute release procedure may be activated automatically by an autopilot upon reaching the ground. In another embodiment, a parachute release procedure may be activated upon reaching the ground. In another embodiment, a parachute release procedure may be remotely activated. In another embodiment, remotely activated may include means of IR (infra red), RF (radio frequency), a combination thereof or any other means of remote activating.

FIG. 2 describes, according to exemplary embodiments, schematics of a recovery process: upon activation of a landing procedure in a UAV (a), a parachute compartment cover opens and a parachute is released (b), the parachute begins deployment while being in the rear end of the UAV (c), the parachute moves towards a vertical position (relative to the UAV) (d) and finally the UAV is hanging from the parachute (e).

Figure 3:
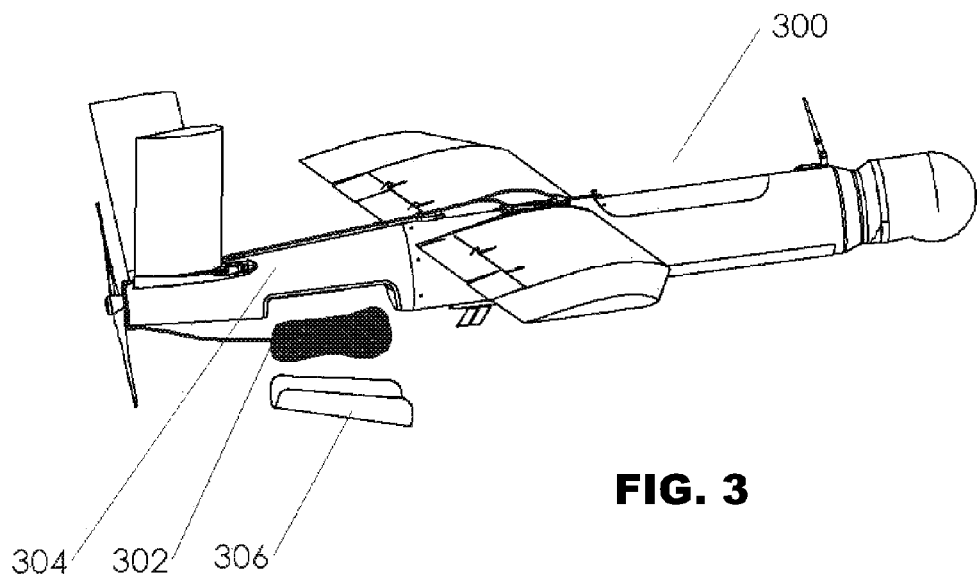
FIG. 3 schematically shows step-1 of a parachute deployment, according to some embodiments.

FIG. 3 describes, according to exemplary embodiments, a UAV (300) during step-1 of the recovery process (parachute release). During this step, among other operations, a folded parachute (302) may be released from a parachute compartment (304) by opening a parachute compartment cover (306). In another embodiment, the folded parachute (302) may fall down by gravity or may be pulled out by aerodynamic forces. According to additional embodiments, during step-1 of the recovery process, the motor of the UAV may stop working (to enable the parachute release), the UAV may reduce speed and an airbag may be inflated.

Figure 4:
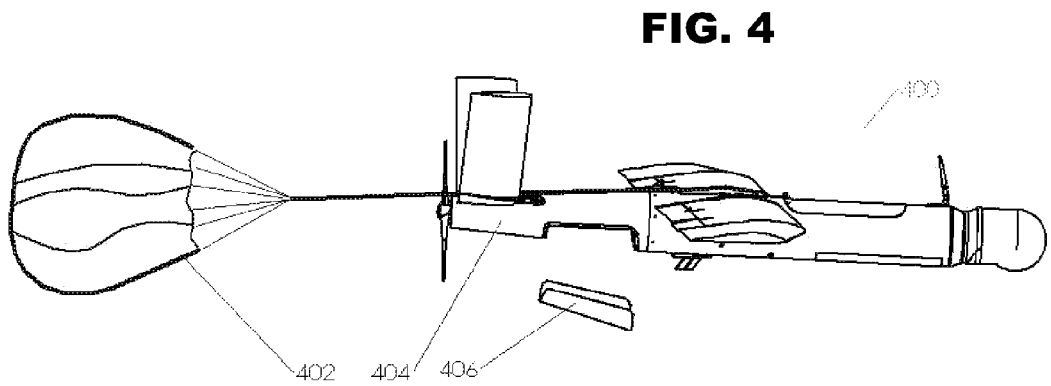
FIG. 4 schematically shows step-2 of a parachute deployment, according to some embodiments.

FIG. 4 describes, according to exemplary embodiments, a UAV (400) during step-2 of the recovery process (parachute deployment). During this step, among other operations, the parachute (402) may start to deploy. The parachute (402) may then move back opposite to flying direction. This may be caused by drag force. Also noted are the parachute compartment (404) and the parachute's compartment cover (406).

Figure 5:
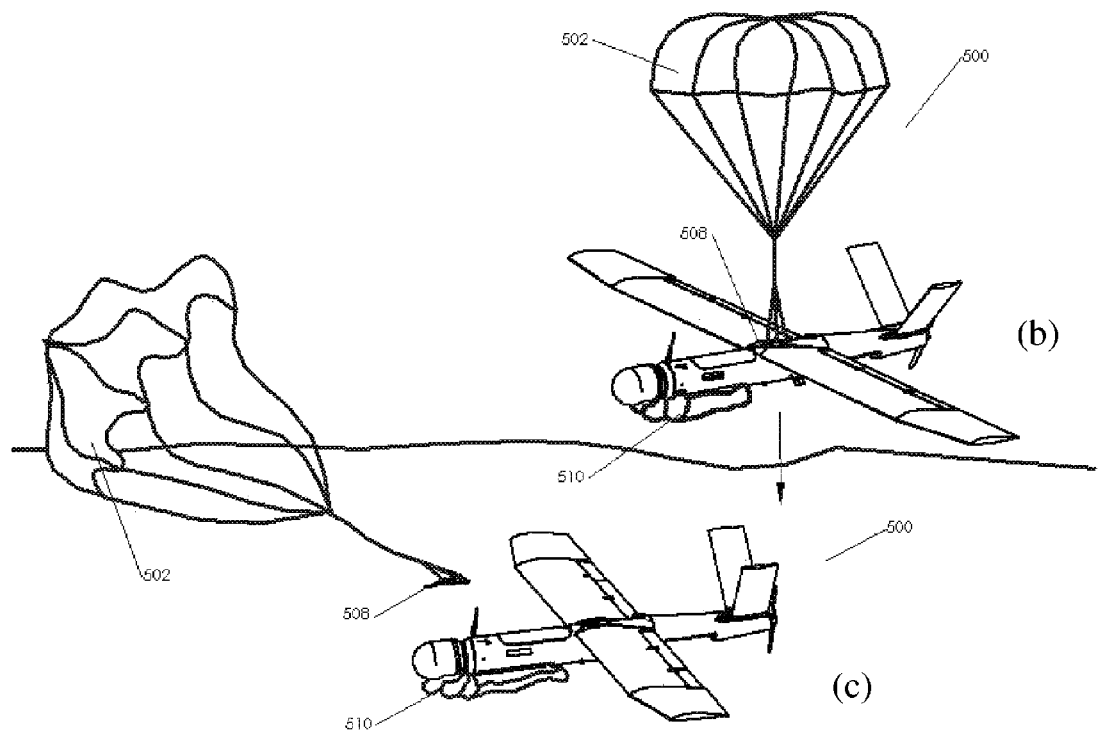
FIG. 5 schematically shows UAV-landing (a) and parachute release (b-c), according to some embodiments.

FIG. 5 describes, according to exemplary embodiments, a UAV (500) during step-3 of the recovery process (parachute full deployment (a), descending until touchdown (b) and parachute release(c)). The deployed parachute (502) may carry the UAV (500) in a position essentially horizontal to the ground (a). The deployment action may apply high force in a very short time and creates high impact force on the parachute release mechanism (508) and to the frame attached to it. The mechanism holding the parachute (508) needs to withstand high impact in the longitudinal direction of the frame. According to additional embodiments, during step-3 or any other step, an airbag (510) located under the payload starts to inflate. During step-4 of the recovery process, when the UAV (500) touches the ground (c) the parachute release mechanism (508) is released and the parachute (502) is no longer connected to the UAV (500).

Figure 6:
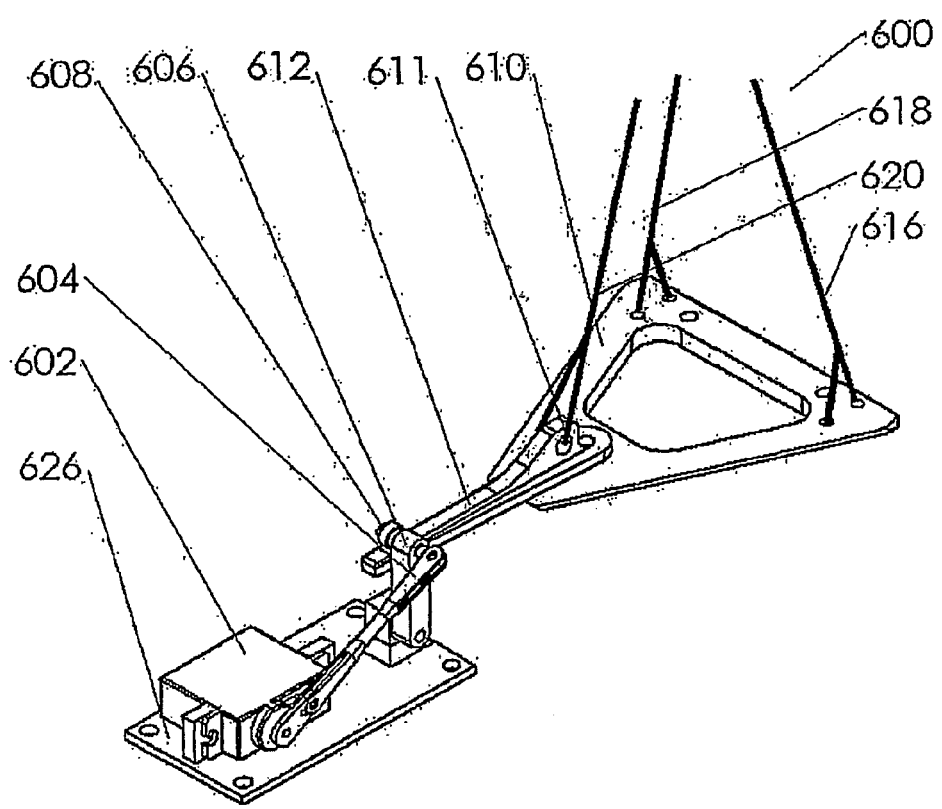
FIG. 6 schematically shows a parachute release mechanism at a locked position, according to some embodiments.

FIG. 6 describes, according to exemplary embodiments, a parachute release device (600) at a locked position The parachute release mechanism (600) may include, according to some embodiments, a servo actuator (602) which by rotational motion may pull a link (604) connected to a release arm (606). This motion may cause the arm (606) with the bearing on it (608) to move forward and release the triangle shaped connecting element (610) with the locking arm (612) (also referred to herein as a connecting arm). The parachute (not shown) is connected to the device by three lines (cables) (616), (618) and (620). Cable 620 is connected to a part of the locking arm (611) which is located above the surface of the triangle shaped connecting element (610). The servo and the locking mechanism (components 606 and 608) may be connected to the fuselage by element (626).

Figure 7:
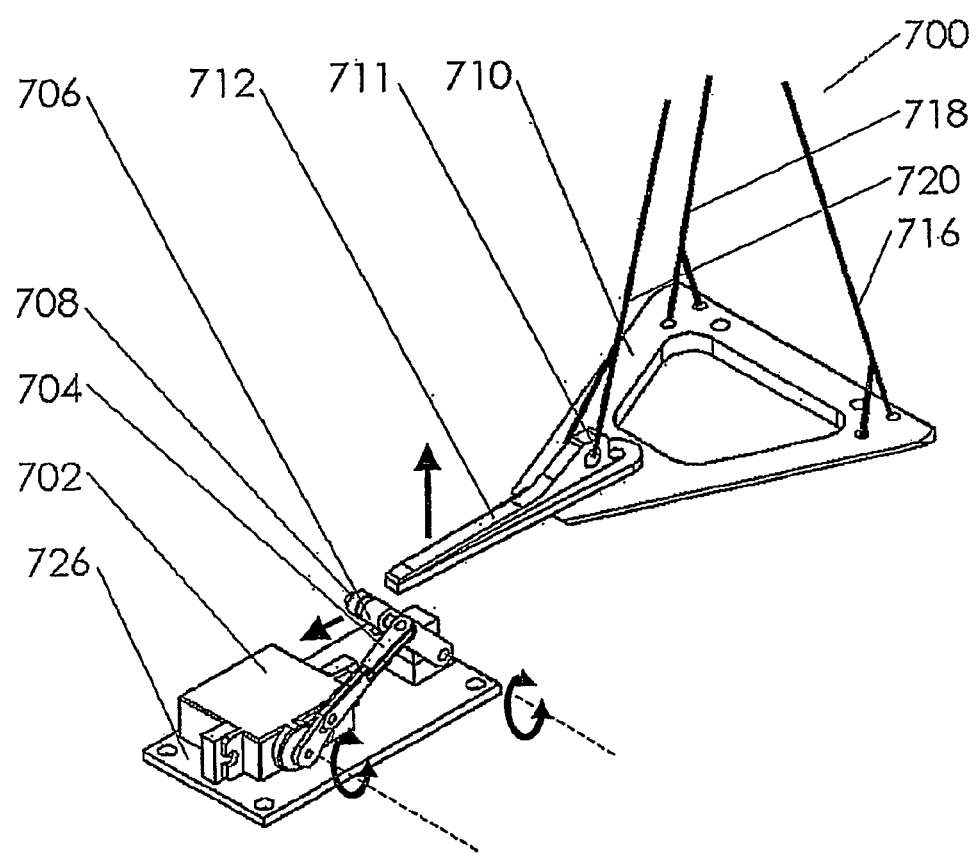
FIG. 7 schematically shows a parachute release mechanism at an opened position, according to some embodiments.

FIG. 7 describes, according to exemplary embodiments, a parachute release device (700) at an opened position. The parachute release devise (700) may include, according to some embodiments, a servo actuator (702) which by rotational motion pulled a link (704) connected to a release arm (706). This motion caused the release arm (706) with the bearing on it (708) to move forward and release the triangle (710) with the locking arm (712). The parachute (not shown) is connected to the device by three lines (cables) (716), (718) and (720). Cable 720 is connected to a part of the locking arm (711) which is located above the surface of the triangle shaped connecting element (710) in order to pull up the triangle from its groove when the parachute is pulling back after release. The servo and the locking mechanism (components 706 and 708) may be connected to the fuselage by element (726).

Figure 8:
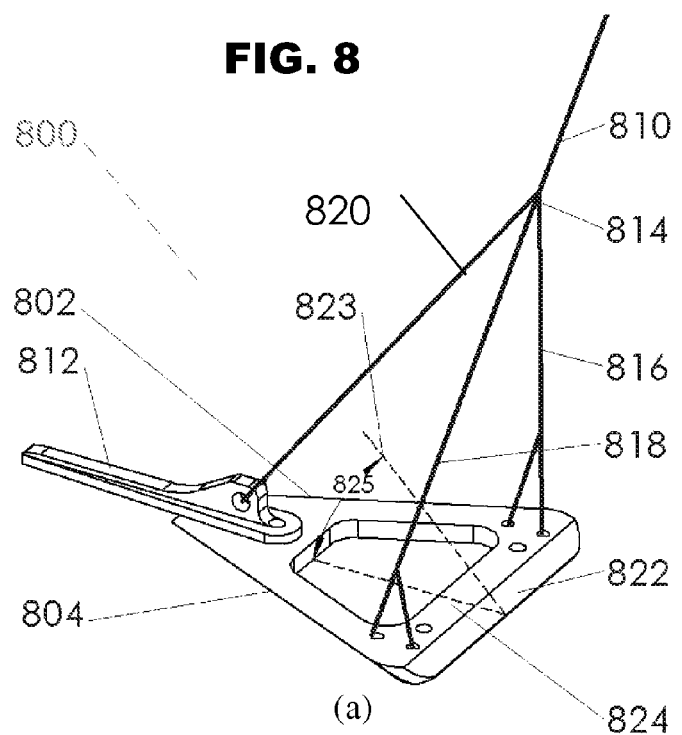
FIG. 8 schematically shows a parachute release mechanism, according to some embodiments.
Figure 8:
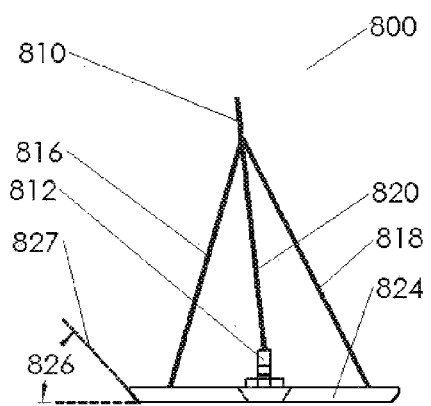
Figure 8:
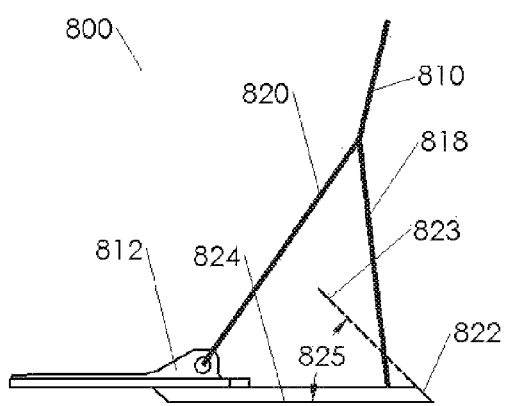

FIG. 8 describes, according to exemplary embodiments, a triangle component (800) designed to be locked within a recessed contour cavity on the surface of the UAV that allow to lock the rear side of the triangle (822) having an undercut shaped edge, locking angle, (825 in FIG. 8b) relative to the lower surface of the triangle (824) that may work as a hinge in the moment of the arm (812) when the front cable (820) is pulling back and released the other edges (802 and 804) which may be shaped in draft angles (826 in FIG. 8c) relative to the lower surface of the triangle (824). This structure enables the parachute release mechanism to disconnect from the recessed cavity with no stress and in any direction. By this action the parachute is not connected to the UAV and cannot cause any damages. The parachute (not shown) is connected to the device by three lines (cables) (816), (818) and (820) which are connected to one cable (810) in one point (814).

Figure 9:
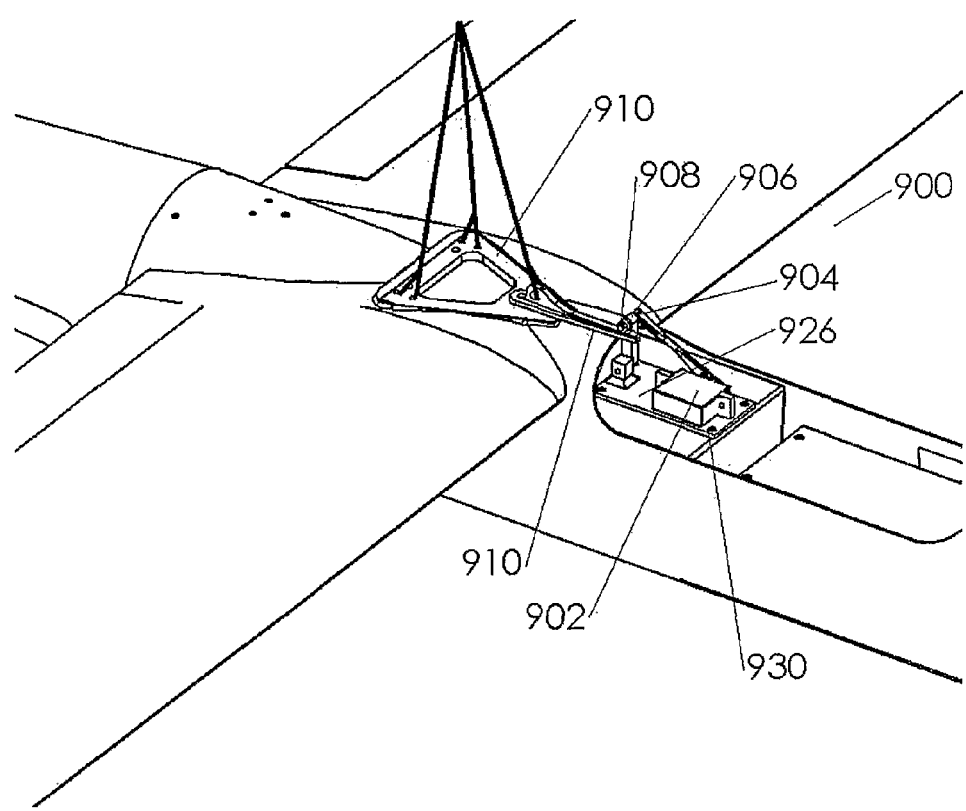
FIG. 9 schematically shows a parachute release mechanism, according to some embodiments.

FIG. 9 describes, according to exemplary embodiments, a parachute release device (900). The parachute release devise may include, according to some embodiments, a servo actuator (902), a link (504) connected to a release arm (906) with the bearing on it (908), a connecting element shaped as a triangle (910) with the locking arm (912). The parachute (not shown) is connected to the device by three lines (cables). The servo (902) and the locking mechanism (components 906 and 908) may be connected to the fuselage by element (926) using screws (930).

The devices and methods referred to herein may also function, operate, be used, structured and/or designed according to any part of the disclosure of U.S. application Ser. No. 60/719,583, incorporated herein by reference.

I claim:

1. A parachute release device comprising:
   a triangular connecting element capable of connecting between an Unmanned Aerial Vehicle (UAV) and a parachute;
   a locking mechanism capable of releasing said triangular connecting element from said UAV upon being actuated; and
   an actuator to (a) actuate said locking mechanism upon touchdown of the UAV with a ground, and (b) cause disconnection of the triangular connecting element from the UAV upon touchdown of the UAV with the ground;
   wherein said locking mechanism is adapted to inhibit a force from being applied to said actuator;
   wherein the triangular connecting element is an isosceles triangle and comprises (A) a first, undercut shaped, base edge having a locking angle relative to a lower surface of the triangular connecting element, and (B) two other side edges shaped in draft angles relative to the lower surface of the triangular connecting element; wherein, when the triangular connecting element is actuated to be connected to the UAV, the first edge and the two other edges are to hold the triangular connecting element within a recessed cavity of the UAV; wherein, when the triangular connecting element is being disconnected from the UAV, the first edge and the two other edges are to disconnect from the recessed cavity of the UAV in any direction, when being pulled by the connected parachute, and to disconnect between the parachute and the UAV in any angle of the parachute relative to the UAV.

2. The parachute release device of claim 1, wherein said force comprises torque.

3. The parachute release device of claim 1, wherein said actuator is a servo motor actuator, a solenoid actuator or a combination thereof.

4. The parachute release device of claim 3, wherein said servo motor actuator is an electric servo motor actuator, a hydraulic servo motor actuator or a combination thereof.

5. The parachute release device of claim 1, wherein said locking mechanism is adapted to secure said connecting element to said UAV when said locking mechanism is in a locked position and to release said connecting element from said UAV when said locking mechanism is in an unlocked position.

6. The parachute release device of claim 5, wherein said locking mechanism is adapted to unlock upon being actuated by an actuator.

7. The parachute release device of claim 1, wherein actuated comprises a rotational movement of said locking mechanism.

8. The parachute release device of claim 1, wherein said connecting element is adapted to fit into a recessed contour cavity on the surface of said UAV.

9. The parachute release device of claim 1, wherein said connecting element is adapted to be in a secured position when said locking mechanism is in a locked position.

10. The parachute release device of claim 1, wherein said connecting element is adapted to be in a non-secured position when said locking mechanism is in an opened position.

11. The parachute release device of claim 1, wherein said connecting element comprises a connecting arm adapted to be held by said locking mechanism when said locking mechanism is in a locked position and to be released from said locking mechanism when said locking mechanism is being actuated by said actuator.

12. The parachute release device of claim 1, further comprising:
   at least three cables to connect the triangular connecting element to the parachute.

13. The parachute release device of claim 12, wherein said at least three cables are connected to one cable or hookup point, wherein said one cable or hookup point is connected to said parachute;
   wherein the at least three cables are connected to said one cable or hookup point both before and after actuation of the parachute release device;
   wherein the one cable or hookup point is connected to the parachute both before and after actuation of the parachute release device.

14. The parachute release device of claim 1, wherein
   an angle between a lower surface of said component and a rear side of said triangular connecting element is shaped to create a locking angle.

15. The parachute release device of claim 1, wherein all angles between a lower surface of said triangular connecting element and each of two sides of said triangular connecting element are draft angles.

16. The parachute release device of claim 1, wherein the parachute release device weighs between 10 grams to 200 grams, and wherein the first edge and the two other edges of the triangular connecting element are adapted to cage the triangular connecting element in a negative groove of a top skin of a lightweight UAV.

17. The parachute release device of claim 1, wherein the base edge and the two side edges of the triangular connecting element are to enable the triangular connecting element to disconnect from the recessed cavity of the UAV upon the UAV touching the ground, even when flipped-over on its upper side.

18. The parachute release device of claim 1, wherein, upon disconnection between the parachute and the UAV, the triangular connecting element remains connected to the parachute.

19. An Unmanned Aerial Vehicle (UAV) comprising a parachute release device, the device comprising:
   a triangular connecting element capable of connecting between said (UAV) and a parachute;
   a locking mechanism capable of releasing said triangular connecting element from said UAV upon being actuated; and
   an actuator to (a) actuate said locking mechanism upon touchdown of the UAV with a ground, and (b) cause disconnection of the triangular connecting element from the UAV upon touchdown of the UAV with the ground;
   wherein said locking mechanism is adapted to inhibit a force from being applied to said actuator;
   wherein the triangular connecting element is an isosceles triangle and comprises (A) a first, undercut shaped, base edge having a locking angle relative to a lower surface of the triangular connecting element, and (B) two other side edges shaped in draft angles relative to the lower surface of the triangular connecting element; wherein, when the triangular connecting element is actuated to be connected to the UAV, the first edge and the two other edges are to hold the triangular connecting element within a recessed cavity of the UAV; wherein, when the triangular connecting element is being disconnected from the UAV, the first edge and the two other edges are to disconnect from the recessed cavity of the UAV in any direction, when being pulled by the connected parachute, and to disconnect between the parachute and the UAV in any angle of the parachute relative to the UAV.

* * * * *